United States Patent [19]

Nomura et al.

[11] Patent Number: 5,317,350
[45] Date of Patent: May 31, 1994

[54] OVERHEAD PROJECTOR

[75] Inventors: Masaaki Nomura; Ko Aosaki; Takashi Kubo; Kenta Namioka, all of Saitama; Koji Takanose, Kanagawa, all of Japan

[73] Assignee: Fuji Photo Film Co., Ltd., Kanagawa, Japan

[21] Appl. No.: 34,463

[22] Filed: Mar. 19, 1993

[30] Foreign Application Priority Data

Mar. 19, 1992 [JP] Japan .................. 4-14935[U]
Mar. 19, 1992 [JP] Japan .................. 4-63937
May 18, 1992 [JP] Japan .................. 4-124630
Jun. 11, 1992 [JP] Japan .................. 4-152449
Jun. 11, 1992 [JP] Japan .................. 4-152450
Mar. 10, 1993 [JP] Japan .................. 5-49664

[51] Int. Cl.⁵ .............................. G03B 21/08
[52] U.S. Cl. ...................... 353/63; 353/DIG. 4; 353/122
[58] Field of Search ............ 353/65, 66, 63, 38, 353/DIG. 4, DIG. 3, DIG. 5, 122

[56] References Cited

U.S. PATENT DOCUMENTS 3,762,809 10/1973 Kato et al. ............... 353/DIG. 4
3,844,650 10/1974 Nicholson et al. ......... 353/DIG. 5
4,732,468 3/1988 Wright .................... 353/DIG. 5
4,921,343 5/1990 Ushiro et al. ............ 353/DIG. 3

Primary Examiner—William A. Cuchlinski, Jr.
Assistant Examiner—William C. Dowling
Attorney, Agent, or Firm—Young & Thompson

[57] ABSTRACT

An overhead projector has a stage on which original material is placed. The stage has a Fresnel mirror. An electrostatic attracting structure is integral with the Fresnel mirror. The attracting structure includes a conductive membrane of ceramic and a resinous dielectric/protective layer. The conductive membrane consists of a pair of comb-shaped electrodes, which interfinger in coplanar fashion, and are covered by the dielectric/protective layer for insulation and protection. A power supply device applies a high voltage of direct current to the electrodes. The original material is attracted electrostatically by the electrodes, and can be kept flat on the stage. In a preferred embodiment, the power supply device incorporates a self-starting blocking oscillator, which is adapted to boost the voltage sufficiently for electrostatic attraction.

40 Claims, 9 Drawing Sheets

OVERHEAD PROJECTOR

BACKGROUND OF THE INVENTION

1. Field of the Invention

The present invention relates to an overhead projector, more particularly to an overhead projector in which an original material can be retained stably on a stage.

2. The Prior Art

An overhead projector has a stage or working surface, and a projector head, which is arranged above the stage and incorporates a projector lens and a mirror. The stage supports an original material, namely a transparency on which opaque images are written or drawn. When the original material is placed on the stage, the image thereof is projected by the projector head onto a remote screen as an enlargement.

There are known two types of overhead projectors differing in position of the light source: the reflection type and the light transmission type. The light source of the reflection type is arranged in a unit incorporating the projector head, and the stage has a Fresnel mirror that supports the original material. On the other hand, the light source of the light transmission type is arranged beneath the stage, on which a Fresnel lens is placed to support the original material.

In conventional overhead projectors, original material to be projected is simply placed on the stage. If the original material is rolled beforehand, a problem has arisen in that the original material does not lie flat on the stage, due to the tendency of the original material to curl. The original material must be manually held, and kept flat and in contact with the stage, before images can be projected.

Furthermore, the original material may be slippery; and when the projector is so positioned that the stage slants, the original material has to be manually held to be kept from slipping along the stage.

OBJECTS OF THE INVENTION

In view of the foregoing problems, an object of the present invention is to provide an overhead projector in which an original material can be kept in reliable contact with a stage when it is placed thereon.

Another object of the present invention is to provide an overhead projector in which an original material can be held spread on a stage by only a simple construction.

SUMMARY OF THE INVENTION

In order to achieve the above and other objects and advantages of this invention, an overhead projector according to the present invention has a stage on which the original material is placed. The stage has a Fresnel plate of which one face is so formed as to be a Fresnel surface, and an electrostatic attracting structure is formed on a top surface of the Fresnel plate integrally with the Fresnel plate for attracting the original material electrostatically. The electrostatic attracting structure includes a conductive membrane constituted by a pair of comb-like electrodes which are arranged in coplanar fashion and which interfinger with each other, and a dielectric/protective layer formed for covering the conductive membrane so as to protect and insulate the conductive membrane. A power supply applies high voltage of direct current to the pair of electrodes. An original material, therefore, can be kept in reliable contact with a stage when it is placed thereon.

In a preferred embodiment, the power supply device includes a first rectifier, which converts a first alternating current from a commercial power source into a first direct current. A self-starting blocking oscillator converts the first direct current into a second alternating current of high voltage. A second rectifier converts the second alternating current into a second direct current of high voltage, which is applied to the two electrodes. A resistor is connected in series with either one of the electrodes for limiting the value of current generated when the electrodes are short-circuited, and has a resistance sufficient to prevent a user from getting an electrical shock.

Accordingly, an original can be held spread on a stage using no more than a simple construction. Even a voltage, such as 1500 V, can be generated by the self-starting blocking oscillator incorporating windings having relatively few turns. Such a blocking oscillator is compact and lightweight, and thus is suitable for an overhead projector of good portability, to convert an alternating current of a commercial power source into direct current of high voltage to be applied to the electrodes.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
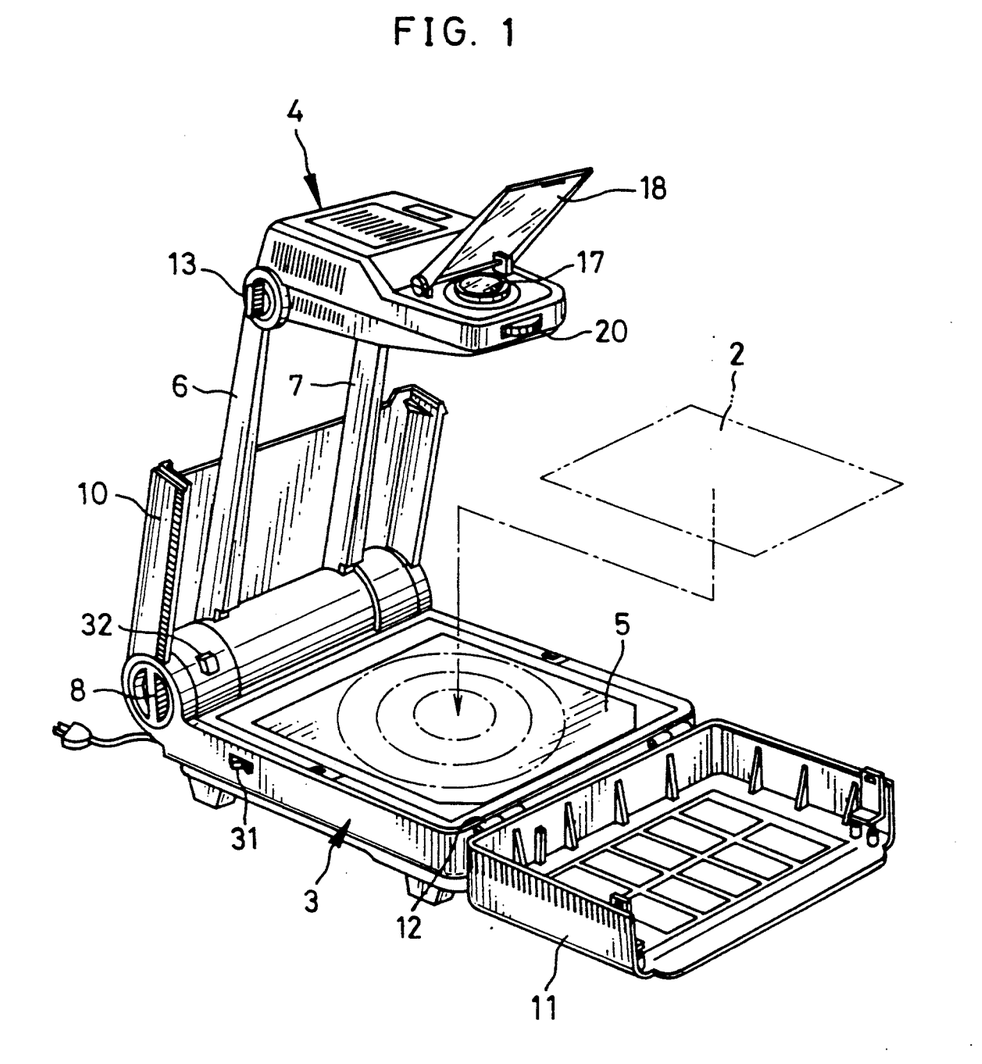
FIG. 1 is a perspective view illustrating a novel overhead projector according to the present invention.
Figure 2:
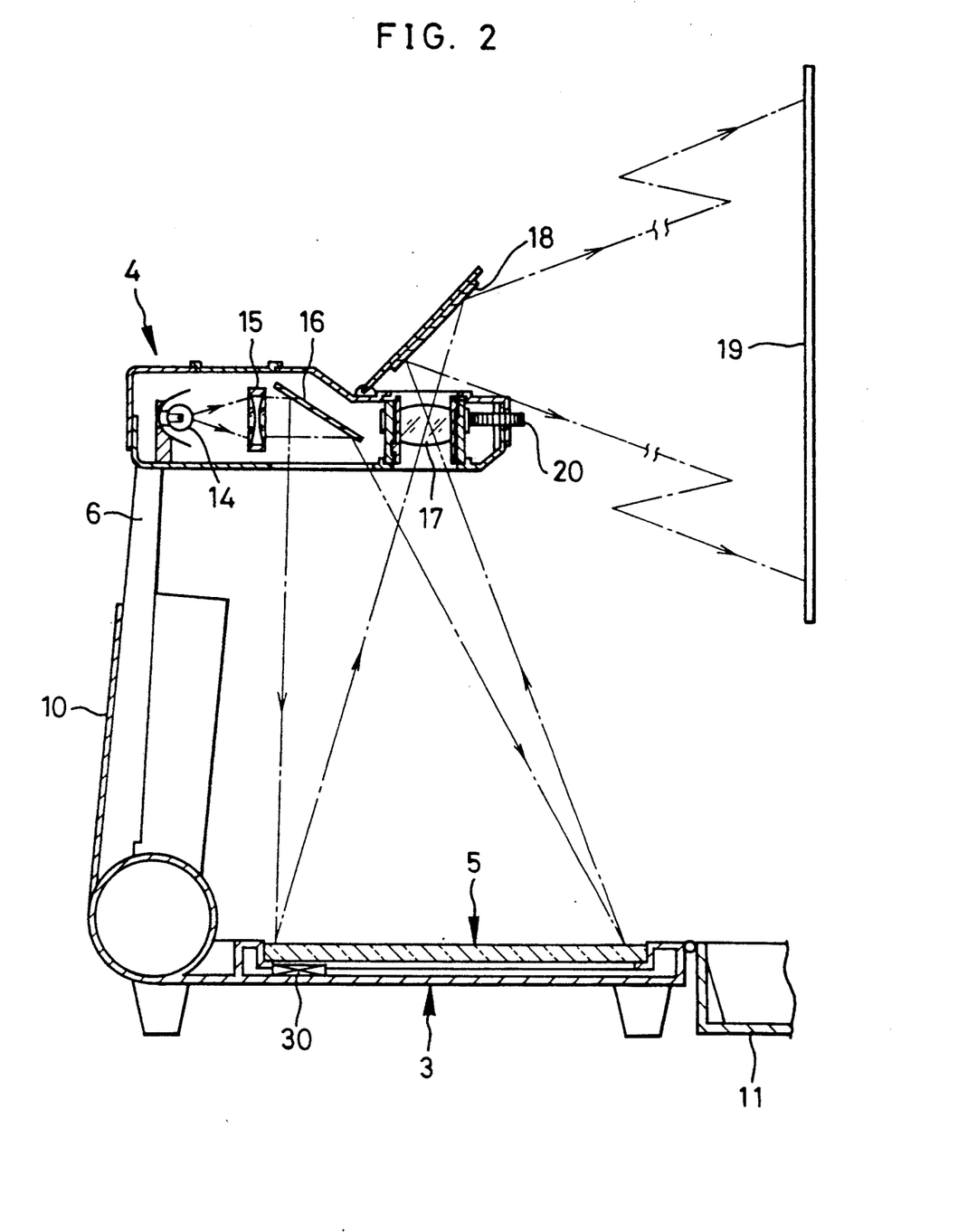
FIG. 2 is a side cross section thereof.

FIGS. 1 and 2 illustrate an overhead projector of the reflection type. A transparency 2 comprising the original material to be projected has opaque images thereon, and is supported on a table 3. A head unit 4 is arranged above the table 3, and incorporates a projector head section and a light source section.

The table 3 has a generally box-like but very thin shape. There is mounted a stage unit 5 on the table 3. On one edge of the table 3 is arranged a pair of arms 6 and 7, which are displaceable between an unfolded, erect position and a folded, collapsed position, of which the former is depicted in FIG. 1. In the folded position, the arms 6 and 7 are folded until in contact with the table 3. The arms 6 and 7 are locked in the unfolded position, locking of the arms 6 and 7 being released when a dial-shaped fastener 8 is rotated and unfastened. The arms 6 and 7 are connected to, and support, the head unit 4 in a swingable fashion. When the head unit 4 assumes the unfolded position, it is positioned to be nearly perpendicular to the arms 6 and 7. When the head unit 4 assumes the folded position, it is received between the arms 6 and 7.

On the arms 6 and 7 is fixedly mounted a half door 10, which is swingable together with the arms 6 and 7. To the table 3 is joined a half door 11 via hinges 1 2. The half door 11 is thus swingable relative to table 3. When the overhead projector is not in use, the arms 6 and 7 are folded down onto the table 3 and covered by the two door halves 10 and 11. The general shape of the door halves 10 and 11 covering the inside of the projector is not only rectangular but also slender, so that the projector is readily portable.

In the unfolded position, the head unit 4 is locked when positioned nearly perpendicular to the arms 6 and 7. Locking of the head unit 4 in the unfolded position is released when a dial-shaped fastener 13 is rotated and unfastened. The light source section of the head unit 4 is constituted by a halogen lamp 14, a condenser lens 15 and a mirror 16. Light from the halogen lamp 14 passes through the condenser lens 15 to the mirror 16. The mirror 16 directs the light downward, and illuminates the original material 2 placed on the stage unit 5 on the table 3.

Beside the mirror 6 is arranged the projector head section, constituted by a projector lens 17 and a projector mirror 18. Light from the original material 2 passes through the projector lens 17 and is directed onto an external screen 19. The projector lens 17 is shifted vertically by manual rotation of an adjuster dial 20 and thereby effects adjustment of the focus so as to project a well-focussed image on the screen 19.

The stage unit 5 has a flat rectangular shape like a board, and is provided with means to effect electrostatic attraction of the original material 2 on the stage unit 5.

Figure 3:
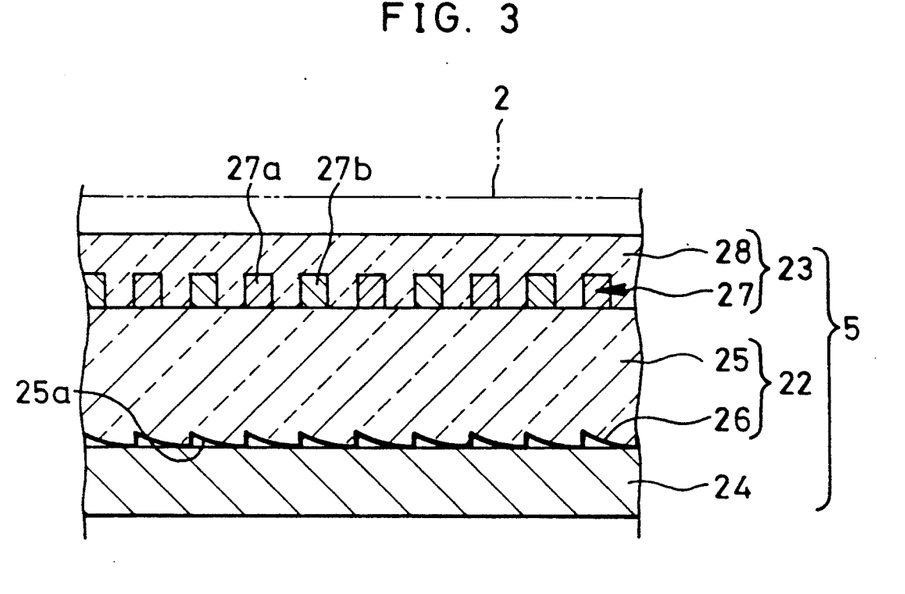
FIG. 3 is an enlarged fragmentary cross section illustrating the layered construction of a stage including a Fresnel mirror.

As illustrated in FIG. 3, the stage unit 5 is constituted of a sandwich comprised by a Fresnel mirror 22, an electrostatic attracting structure 23, and a reinforcing plate 24. The electrostatic attracting structure 23 is transparent. The reinforcing plate 24 is attached to the underside of the Fresnel mirror 22, and is preferably an aluminum plate which is desirably light in weight.

The Fresnel mirror 22 is constituted by a Fresnel plate 25 and a reflecting layer 26. The lower surface of the Fresnel plate 25 is a Fresnel surface 25a having a number of annular concentric concave portions, on which the reflecting layer 26 is formed of aluminum by vacuum deposition. The Fresnel plate 25 is formed from transparent material, plastic or glass, and can be preferably formed of synthetic resin such as polymethyl methacrylate (PMMA) or amorphous polyolefin (APO), and may have a thickness form 0.3 to 2 mm.

The attracting structure 23 is constituted by two transparent layers: a conductive membrane 27 and a dielectric/protective layer 28 for insulating and protecting the former. The conductive member 27 is thin and of transparent ceramic. The ceramic for the conductive membrane 27 is preferably $In_2O_3$ with a doping of $SnO_2$, so-called tin—including indium oxide (ITO), or $SnO_2$ with a doping of $Sb_2O_3$. The conductive membrane 27 has a thickness of 0.02 to 2 $\mu$m. To form the conductive membrane 27, there may be used various methods: a coating process, a sputtering process, a spraying process, a chemical vapor depositing (CVD) process, or a vacuum deposition process, among others. The coating process consists of applying a coating of a solution and thermosetting the solution. The CVD process consists of heating vapor, applying the vapor to glass and decomposing it pyrolytically.

The conductive membrane 27 may be a thermoset resin, an ultraviolet curing resin, or an electron radiation curing resin. For producing a coating of ultraviolet curing resin, a spincoating process is used. For a thermoset resin, or an electron radiation curing resin, a dipping process is used. Whichever the resin, it is applied as the conductive membrane 28 at the thickness from 1 $\mu$m to 1 mm. Instead of these coating techniques, the conductive membrane 27 may be formed by a vacuum deposition process or by a sputtering process and with a thickness of from 0.01 to 1 $\mu$m.

Figure 4:
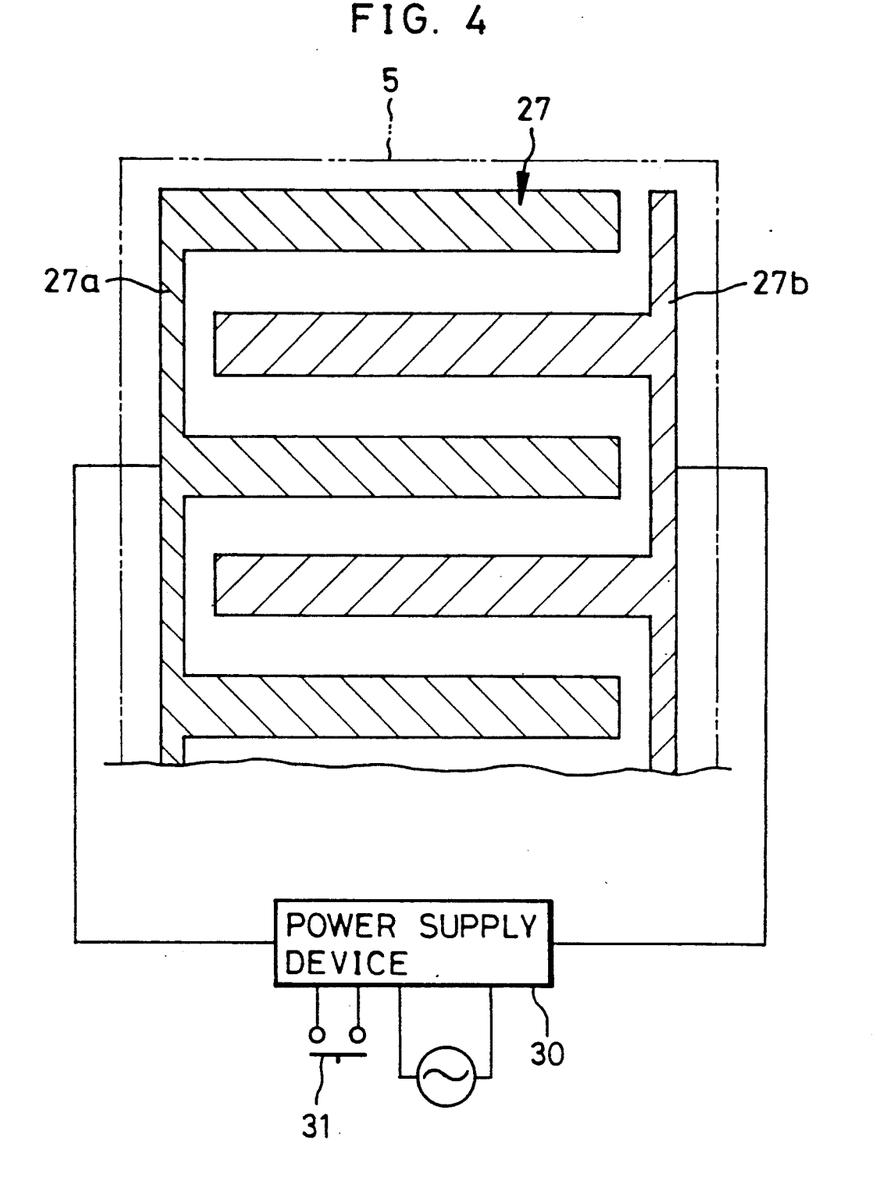
FIG. 4 is an explanatory view illustrating a pair of electrodes incorporated in the stage to produce electrostatic attraction.

The conductive membrane 27 includes two patterns, which interfinger with each other, and constitute a pair of electrodes, anode 27a and cathode 27b formed by photoetching of the deposited membrane. Each pattern is shaped like a comb having teeth. The tooth portions of the electrodes 27a and 27b are 1 to 5 mm wide, more broadly 0.1 to 5 mm wide. The intervals between these tooth portions are 1 to 5 mm, but may be as little as 0.01 mm, and preferably are 2 mm or less. The electrodes 27a and 27b are connected via connectors to a power supply device 30 incorporated in the table 3. When an attracting switch 31 is turned on, the power supply device 30 applies a voltage to the electrodes 27a and 27b by direct current, at a high voltage from 300 to 3000 V, preferably a voltage of about 1500 V. The two electrodes 27a and 27b are insulated one from another by the dielectric characteristic of the layer 28.

The operation of the novel overhead projector will now be described. To unfold the overhead projector, the arms 6 and 7 are erected as seen in FIG. 1. The head unit 4 is swung from between the arms 6 and 7, and locked in an orientation substantially parallel to the table 3. The projector mirror 18 is swung up and positioned at an inclination of about 45° relative to head unit 4. A power switch 32 is turned on, to actuate the halogen lamp 14 and a cooling fan (not shown) for blowing air across the lamp 14 to cool it.

With the original material 2 placed on the stage unit 5, the attracting switch 31 is turned on. The power supply device 30 converts the alternating current of the commercial electric power of voltage 100 V into direct current of a voltage of about 1500 V, which is applied to the anode 27a and cathode 27b of the conductive membrane 27. The anode 27a is charged electrostatically to be positive, while the cathode 27b is charged to be negative, both in correspondence with a capacitance defined between them. The electrostatic field as formed between the anode 27a and the cathode 27b attracts the original material 2, which his thereby kept flat on the stage unit 5.

As illustrated in FIG. 2, the light from the halogen lamp 14 passes through the condenser lens 15, to the mirror 16, and thence to the original material 2 on the stage unit 5. The light passing through the original material 2 falls on the stage unit 5. The light passes through the attracting structure 23 and the Fresnel plate 25 to the reflecting layer 26.

The reflecting layer 26 reflects the light, which passes back through the Fresnel plate 25, the attracting structure 23 and the original material 2 to the projector lens 17. The light passing through the projector lens 17 is reflected by the projector mirror 18 and falls on the screen 19, on which the image of the original material 2 appears in enlargement as a projected image of the original. Note that the transmittance of the conductive membrane 27 is 80% or more, so that there is little reduction of light by passage through it.

When the original material 2 is to be replaced, the attracting switch 31 is turned off. As a result, the application of the voltage to the electrodes 27a and 27b is stopped, so as to release the original material 2 from electrostatic attraction.

The ceramic of the conductive membrane 27 is for example ITO, namely $In_2O_3$ with a doping of $SnO_2$. A coating of transparent conductive liquid is applied, e.g. an ink-like ITO dispersion or a coating fluid comprising an ITO dispersion, and is thermoset to form the conductive membrane 27.

To apply the coating to be thermoset, the screen printing method is desirable, for which a preferred screen has a mesh of 270 to 300, and a thickness of 3 to 4 μm. Thermosetting is effected by drying the conductive liquid at 40° to 80° C. for 15 minutes. The ink-like ITO dispersion may be made by dispersing a fine powder of ITO having a particle size of 250 Angstroms in a solution of an organic resin such as PMMA. The conductive membrane 27 after drying has a thickness from 2 to 3 μm, a surface resistance from 0.5 to 1 kΩ per square, a light transmittance from 80 to 83%, and haze from 10 to 12%. The thickness of the conductive membrane 27 can be as little as 1 μm, or less, by appropriate preparation of the ink-like ITO dispersion, in which case the light transmittance thereof can be 85% or more.

When the Fresnel plate 25 is formed from resin such as PMMA or APO, the conductive membrane 27 is formed according to a microwave plasma sputtering process which requires no high temperature, as those materials are otherwise insufficiently heat resistant.

Figure 5:
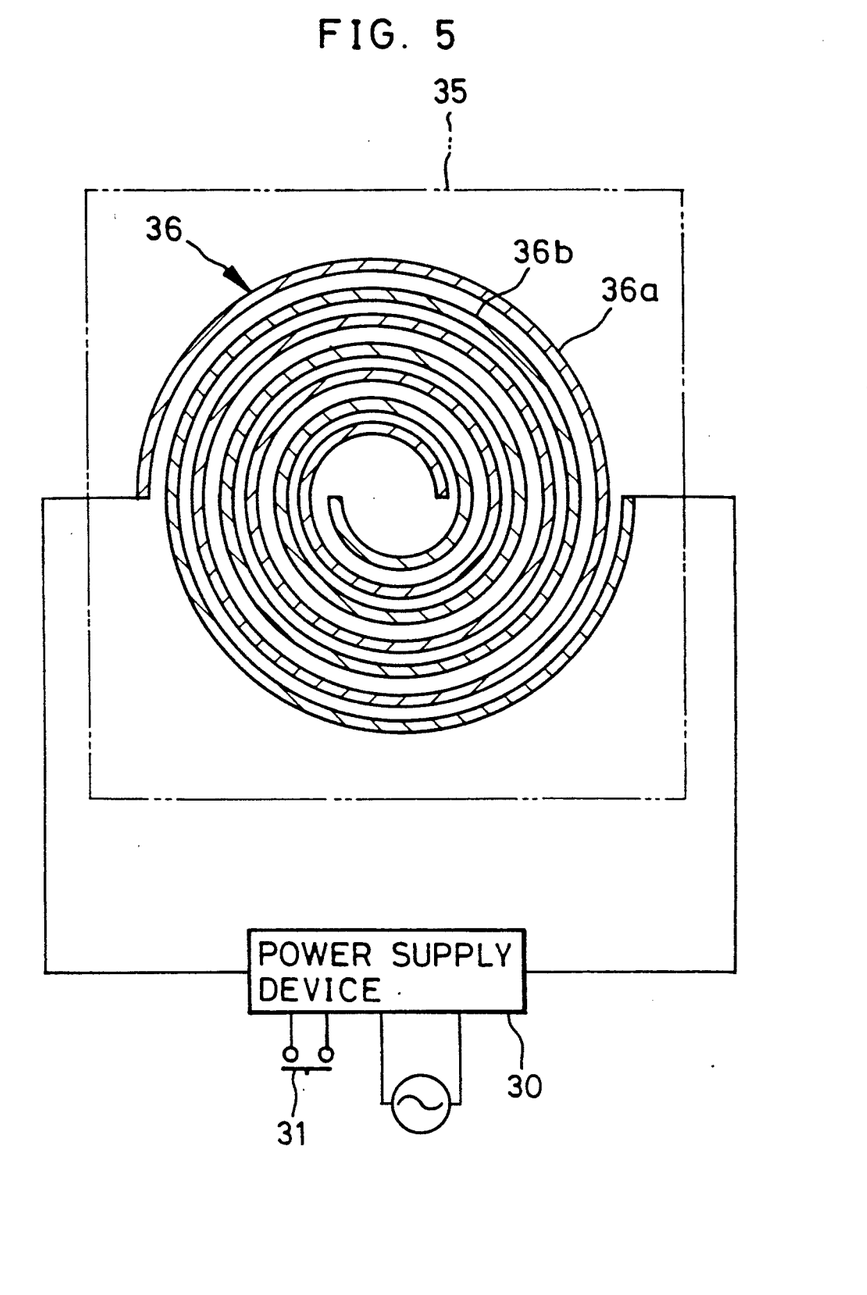
FIG. 5 is a view similar to FIG. 4 illustrating another embodiment.

Although in the above embodiment the electrodes 27a and 27b alternate in the form of comb teeth, the electrodes for electrostatic attraction may have other forms. As illustrated in FIG. 5, a stage unit 35 has a conductive membrane 36 in which an anode 36a and a cathode 36b are combined as an alternate pair of spiral patterns. Such patterns can easily be produced by a photoetching process. The spiral patterns are positioned in the stage unit 35 to be concentric with concentric circles defining the Fresnel surface 25a of the Fresnel mirror 22. This is favorable in that the patterns of the conductive membrane 36 are inconspicuous and in that there is little irregularity of light transmission through them. Furthermore, the spiral patterns may be replaced by a number of concentric circles formed at a predetermined difference in radius, among which even-numbered concentric circles may constitute an anode, the odd-numbered concentric circles constitute a cathode. In all such cases, however, the electrodes interfinger.

Figure 6:
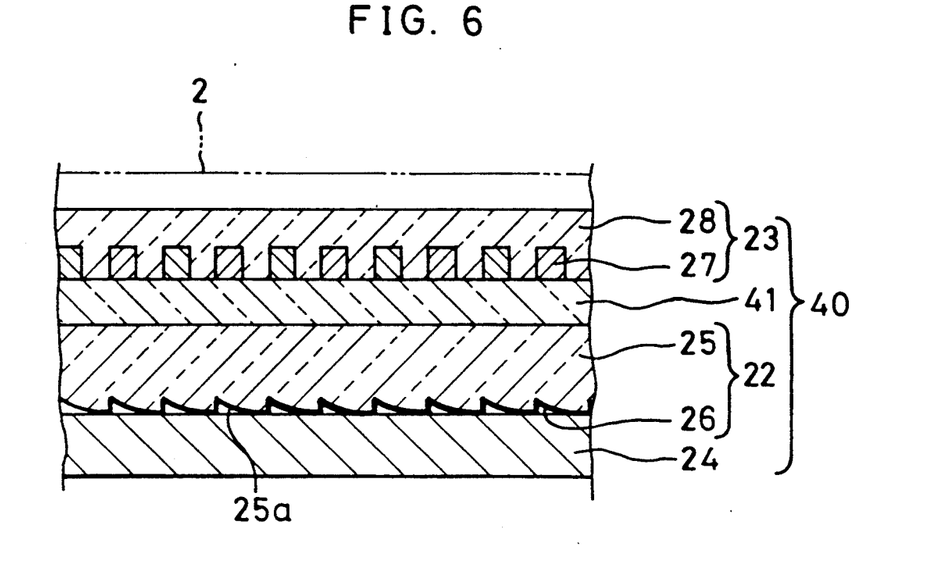
FIG. 6 is a cross section illustrating a layered construction of another preferred stage unit having a prime coat layer.

FIG. 6 illustrates another preferred embodiment, in which elements similar to those in the former embodiment are designated with the identical reference numerals. A stage unit 40 is provided with a transparent prime coat layer 41 on the Fresnel mirror 22 and below the electrostatic attracting structure 23. The prime coat layer 41 is composed for example of $SiO_2$. For the transparent conductive liquid, ITO as above is applied, and thermoset after application.

Figure 7:
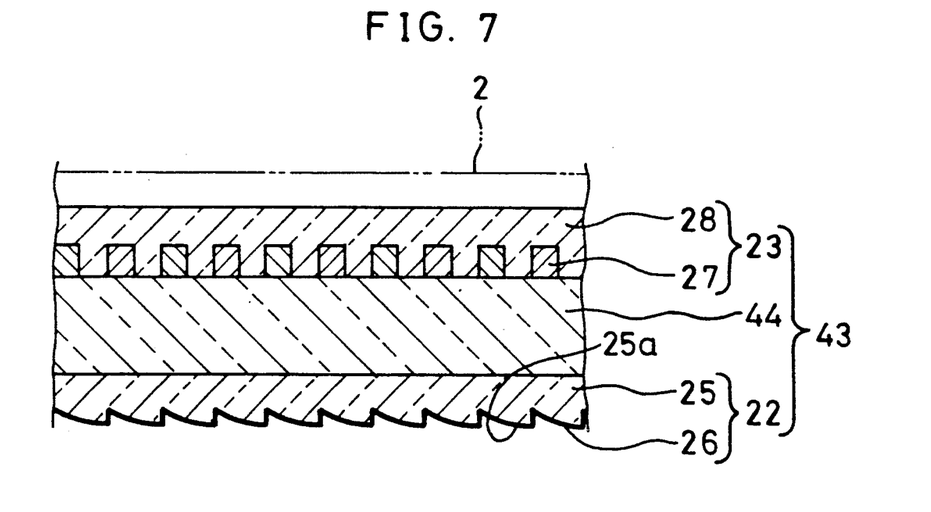
FIGS. 7 through 11 are views similar to FIG. 3 but illustrating alternative embodiments.

In FIG. 7, another preferred stage unit 43 is provided with a transparent base plate 44 on the Fresnel mirror 22 and below the electrostatic attracting structure 23. The base plate 44 is so attached as to maintain flat the stage unit 43, and consists of a glass plate 0.5 to 2 mm thick. The Fresnel plate 25 is formed from PMMA or APO as described above.

To produce the stage unit 43, the base plate 44 is coated with the conductive membrane 27, and with the dielectric/protective layer 28. The bottom of the base plate 44 is attached to the flat face of the Fresnel mirror 22 by application of transparent adhesive. Use of the base plate 44 requires no reinforcing plate 24 as in FIG. 3. The thickness of the conductive membrane 27 is preferably from 0.05 to 0.5 μm.

Figure 8:
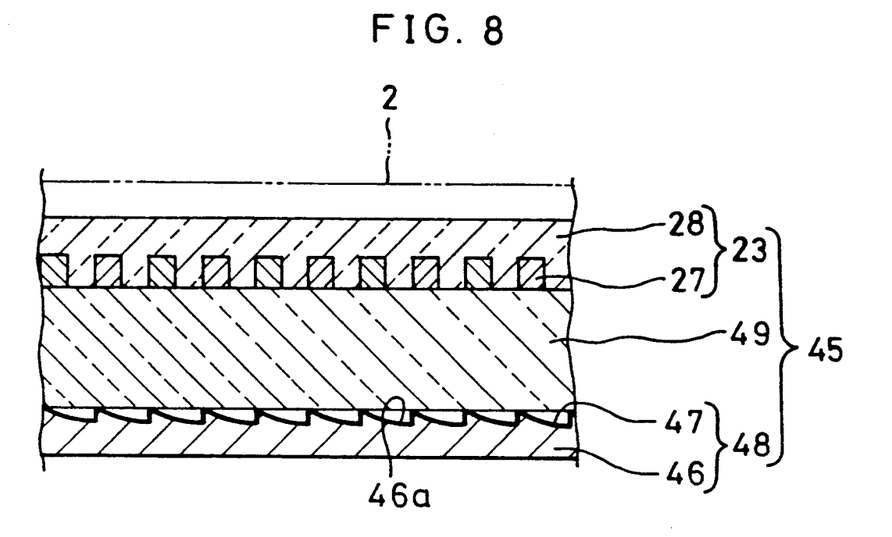

In FIG. 8, a stage unit 45 has a Fresnel mirror 48, in which the upper surface of the Fresnel plate 46 is provided with convex Fresnel surface 46a. A reflecting layer 47 is formed on the Fresnel surface 46a. A base plate 49 overlies the Fresnel mirror 48. The base plate 49 is a thin glass plate secured to the Fresnel mirror 48 by transparent adhesive. A layer like the base plate 49 can be also formed by applying a coating of liquid glass to the Fresnel mirror 48. The base plate 49 is so attached as to keep flat the stage unit 45, and is 0.2 to 0.8 mm thick.

The base plate 49 is coated with the conductive membrane 27, and with the dielectric/protective layer 28. When using a liquid glass coating for the base plate 49, the Fresnel mirror 48 can be coated with liquid glass, then the conducive membrane 27, and the dielectric/protective layer 28. Note that the light incident on the Fresnel mirror 48 is reflected from its upper surface by the reflecting layer 46a, so that the Fresnel plate 46 can be opaque instead of transparent. The thickness of the conductive membrane 27 herein is preferably from 0.005 to 10 μm.

Figure 9:
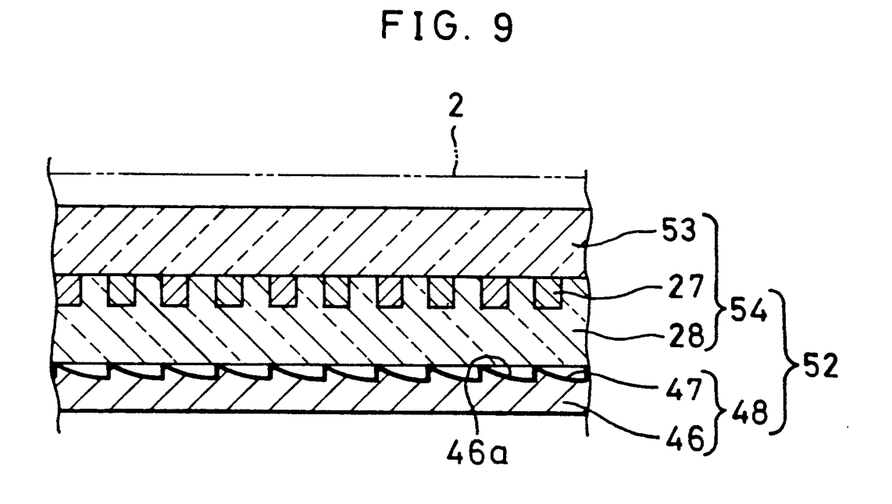

In FIG. 9, a stage unit 52 has an electrostatic attracting structure 54 having a base plate 53, which is coated with the conductive membrane 27, and with the dielectric layer 28. The base plate 53 is uppermost, above the conductive membrane 27, so that the dielectric layer 28 is attached to the Fresnel mirror 48. The protective base plate 53 consists of a glass plate 0.2 to 0.8 mm thick.

Figure 10:
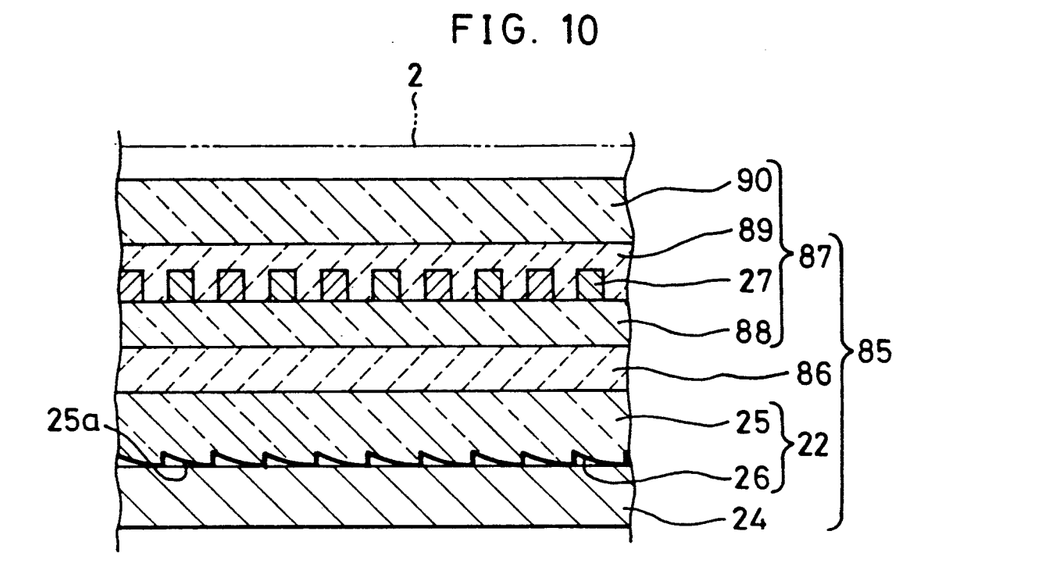

In FIG. 10, a stage unit 85 is constituted by the Fresnel mirror 22, an electrostatic attracting structure 87 attached by an adhesive layer 86, and the reinforcing plate 24. The electrostatic attracting structure 87 consists of a base sheet 88 of transparent flexible resin, the conductive membrane 27, a dielectric/protective adhesive layer 89, and a protective top sheet 90. Note that the electrodes 27a and 27b may be insulated not by the adhesive layer 89 but by air. In that latter case, dielectric/protective adhesive layer 89 may be omitted, instead of which an adhesive can be applied only to margins of the base sheet 88 and the protective top sheet 90.

The base sheet 88 is 125 μm thick. Polyethylene terephthalate (PET) is preferred for the material of the base sheet 88, in view of its resistance to heat. To form the conductive membrane 27 on the base sheet 88, an overall heating vacuum depositing process or a sputtering process are applicable.

The thickness of the conductive membrane 27 herein is preferably from 0.005 to 5 μm. The protective top sheet 90 is 50 μm thick, is a poor conductor, and protects the conductive membrane 27. PET is preferred for the material of the protective top sheet 90. A glass sheet can be also used for the top sheet 90. The glass top sheet 90 preferably has a thickness from 0.3 to 2 mm.

Figure 11:
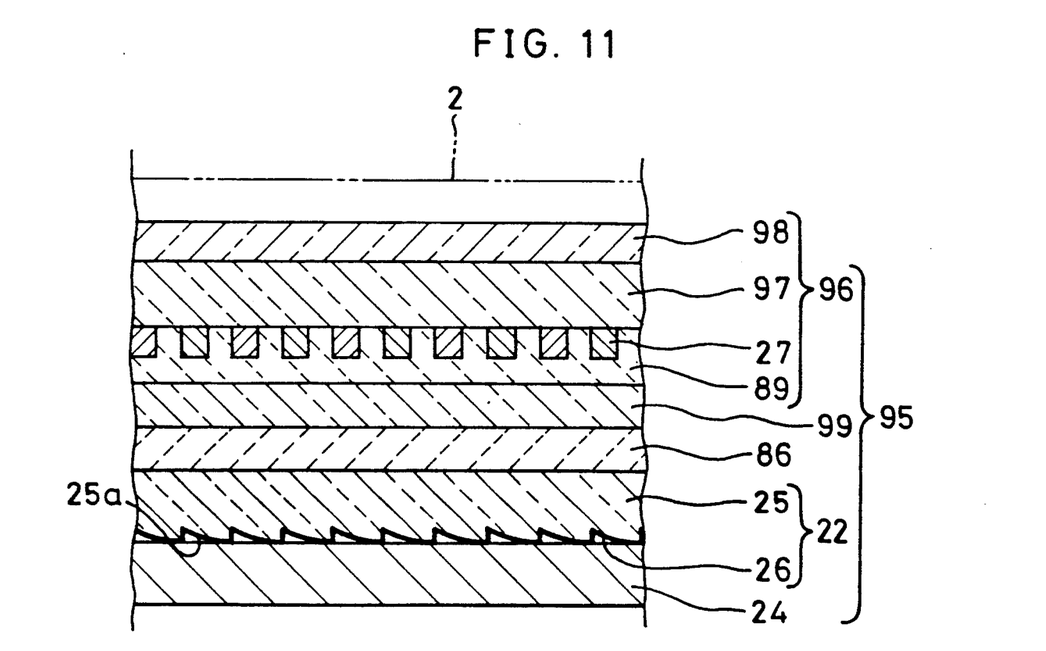

In FIG. 11, a stage unit 95 is constituted by the Fresnel mirror 22, an intermediate sheet 99 attached by an adhesive layer 86, an electrostatic attracting structure 96, and the reinforcing plate 24. The electrostatic attracting structure 96 consists of a protective base sheet 97, the conductive membrane 27, a dielectric adhesive layer 89, and a hard coating layer 98. The intermediate sheet 99 is of transparent flexible resin such as PET, and is 125 μm thick. The protective base sheet 97 for supporting the conductive membrane 27 is a PET sheet 50 μm thick, is a poor conductor, and protects the conductive membrane 27. The hard coating layer 98 is preferably formed to have hardness of 3H.

Note that the electrodes 27a and 27b again may be insulated not by the adhesive layer 89 but by air. In this case, again, dielectric adhesive layer 89 may be omitted, instead of which an adhesive can be applied only to margins of the protective base sheet 97 and the intermediate sheet 99.

To convert the alternating current of a commercial power source into the direct current at the voltage to be applied to the anode and cathode, there are used an audio-frequency transformer and a rectifier. However, a boost in voltage up to 1500 V in the present embodiments would require a transformer incorporating a copper core and windings having very many turns. Such a transformer would be huge and overweight, and thus is inappropriate for a readily portable overhead projector.

Figure 12:
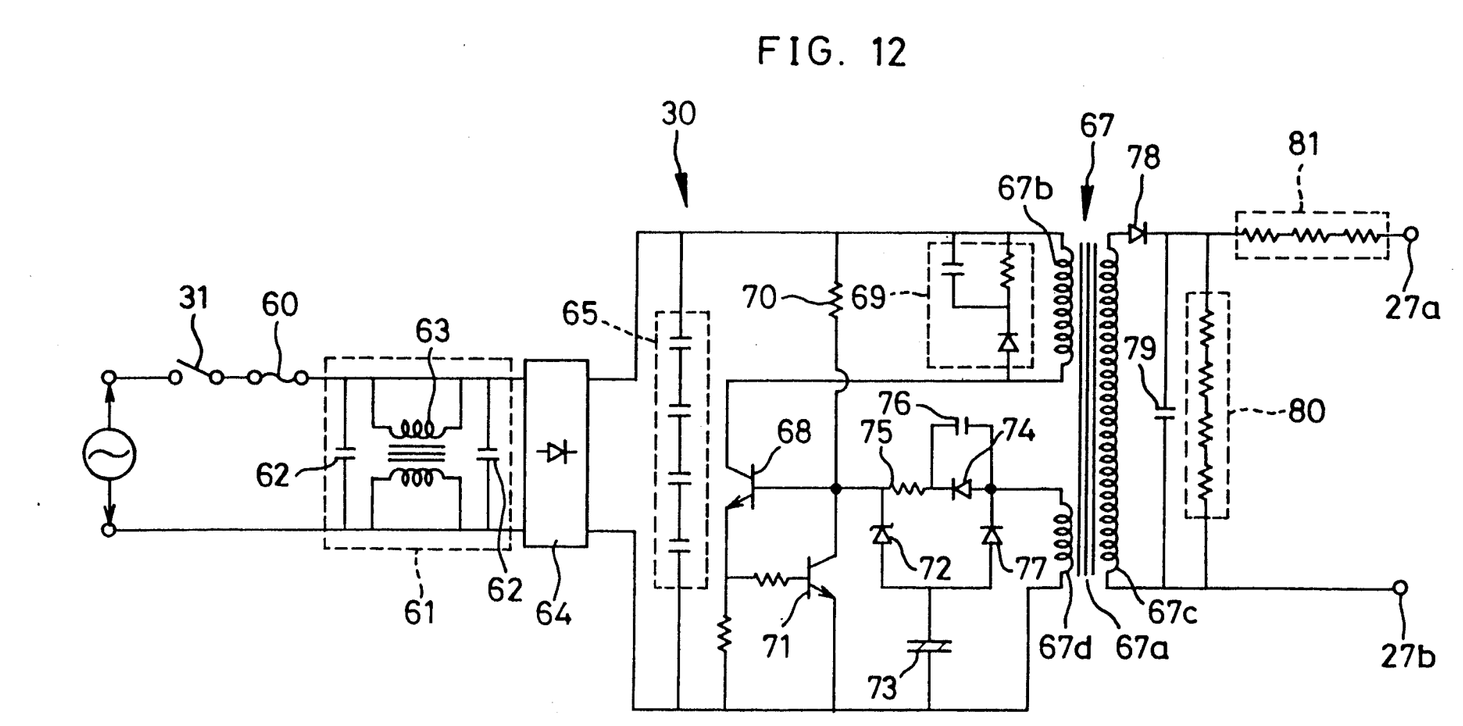
FIG. 12 is a block diagram illustrating a power supply device suitable for supplying power to the electrodes in the stage.

FIG. 12 illustrates the novel power supply device 30 of which the size and weight are desirably small. To the attraction switch 31 is connected a fuse 60 in series. The fuse 60 responds to a flow of current above a predetermined value, e.g. 200 mA, and then isolates the power supply device 30. A noise filter 61 is constituted of two capacitors 62 of small capacitance and two windings 63. The noise filter 61 absorbs high-frequency electrical noises contained in the commercial power source of alternating current of a voltage of, say, 100 V, and absorbs electrical noises generated within the power supply device 30 so as to supply noise-free power to the electrodes 27a and 27b.

The alternating current free from electrical noise is sent to a rectifier 64 constituted by four diodes connected as a bridged circuit. The rectifier 64 converts the current into a pulsating current. A smoothing circuit 65 is constituted by four capacitors connected in series, and smooths the pulsating current to be 130 to 140 V of direct current. The smoothing circuit 65 may be a single capacitor of a considerable capacitance, but preferably consists of four capacitors of a smaller capacitance in order to be highly proof against excessive voltage.

A transformer 67 and a first transistor 68 constitute a self-starting blocking oscillator for converting the direct current of low voltage into direct current of a high voltage of, say, 1500 V. The transformer 67 is composed of a core 67a, e.g. ferrite of a small weight, a primary winding 67b, a secondary winding 67c and a tertiary winding 67d.

The primary winding 67b is connected in parallel to a noise absorber 69, which supplies the primary winding 67b with electrical noises of high frequency created in the primary winding 67b, so as to absorb the electrical noises. A resistor 70 is adapted to turn on the first transistor 68 in an initial step. A second transistor 71 is adapted to turn off the first transistor 68 when a current of 2 mA or more flows at the emitter of the first transistor 68, and so blocks excess current in the input circuit.

A Zener diode 72 and an electrolytic capacitor 73 cooperate to determine the voltage to be applied to the first transistor 68. The electrolytic capacitor 73 has a capacitance such as to determine the frequency of oscillation of the blocking oscillator. A diode 74 and a resistor 75 are connected in series such as to be a feedback circuit for feeding the voltage produced at the tertiary winding 67d back into the first transistor 68. Reference numeral 76 designates a speed-up capacitor. Reference numeral 77 designates a discharge diode.

The alternating current generated in the secondary winding 67c is subjected to half-wave rectification by a diode 78, and smoothed by a capacitor 79 and converted into a direct current of a voltage of, say, 1500 V. Direct current of this high voltage is applied to the pair of electrodes 27a and 27b constituting the conducive membrane 27. In the present embodiment, no load is applied between the two electrodes 27a and 27b. A dummy resistor 80 is connected in parallel with the capacitor 79. Were it not for the dummy resistor 80, no current would flow in the secondary winding 67c so that operation of the self-starting blocking oscillator would be unstable. The dummy resistor 80 avoids this difficulty, as it has a high resistance.

The power supply device 30 is connected via a connector 50 the two electrodes 27a and 27b. If the connector should be incompletely connected, there would be a danger that a user of the overhead projector would get an electrical shock upon touching it. Should the dielectric/protective layer 28 be so scratched as to cause the conductive membrane 27 to be exposed, the user might also get an electrical shock upon touching in such a way as to short-circuit the electrodes 27a and 27b. To avoid electrical shocks to humans, there is connected a resistor 81 for the protection of users against such short-circuiting. It is known that the minimum electrical current discernible to humans is 3.5 mA generally, having regard for differences between sexes and individuals. The resistance of the resistor 81 is 1 MΩ, so that a current of only 1.5 mA flows even when a user touches and short-circuits the electrodes 27a and 27b.

The operation of the power supply device 30 will now be described. When the switch 31 is closed, the alternating current of voltage 100 V is converted by the rectifier 64 into direct current of a voltage from 130 to 140 V. This direct current causes a base current to flow in the base of the first transistor 68 via the resistor 70. The first transistor 68 is turned on, so as to cause a collector current to flow through the primary winding 67b.

The current as passed through the resistor 70 flows through the Zener diode 72 and into the electrolytic capacitor 73 so as to charge the capacitor 73. The first transistor 68 is thereby turned on. AT this time, a counter electromotive force is generated in the secondary winding 67c so as to give negative polarity to the side of the diode 78. A voltage is generated in the tertiary winding 67d so as to make the side of the diode 74 positive. A base current is supplied to the first transistor 68, so that the collector current of the first transistor 68 further increases.

In the primary winding 67b of the transformer 67, the collector current flowing gradually increases. In the secondary winding 67c, a high voltage is generated in accordance with the turn ratio between the windings 67b and 67c. The high voltage is converted by the diode 78 and the capacitor 79 into a direct current, which is applied to the two electrodes 27a and 27b via the resistor 81. Because the base current flows constantly into the first transistor 68, the collector current of the first transistor 68 is saturated.

No base current into the first transistor 68 is supplied by the tertiary winding 67d, whereby the collector current of the first transistor 68 decreases rapidly. When the current in the secondary winding 67c falls to zero, the reversal generates such current in the secondary winding 67c as to change the side of the diode 78 to positive. A counter electromotive force is generated in the secondary winding 67d again, so as to restart supplying the base current from the tertiary winding 67d. In this manner, the self-starting blocking oscillator continues oscillation so as to generate a high voltage in the secondary winding 67c.

During oscillation of the self-starting blocking oscillator, an emitter current rises above a predetermined value. Then the second transistor 71 is turned on, to decrease the base voltage of the first transistor 68 until the first transistor 68 is turned off. Upon turning off of the first transistor 68, the second transistor 71 is also turned off. After this, the connection of the resistor 70 turns on the first transistor 68 again, so as to restart the self-starting blocking oscillator to oscillate.

In these embodiments, the head unit 4 is unfolded and locked when positioned nearly vertically to the arms 6 and 7. Alternatively the head unit 4 may be mounted to be adjustable as to angular position with respect to the arms 6 and 7, and may be locked by fastening of the rotatable fastener 13.

Although the present invention has been described in relation to an overhead projector of the reflection type, in which the lamp 14 is arranged over the table 3, the present invention is also applicable to an overhead projector of the light transmission type, in which a lamp is arranged under the stage. For this latter type, a transparent Fresnel lens is used instead of a Fresnel mirror. A mirror is arranged below the Fresnel lens at an inclination of 45°. Illumination emanating from the bottom-arranged lamp is directed via the mirror to the Fresnel lens.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. An overhead projector having a light source for illuminating an original material comprising a transparency and a projector head positioned above said original material and adapted to project an image of said original material onto a screen, said overhead projector comprising:
    a stage on which said original material is supported, said stage having a Fresnel plate of which one surface is formed to be a Fresnel surface, and an electrostatic attracting structure on the upper side of said Fresnel plate and integral with said Fresnel plate, for attracting said original material electrostatically;
    said electrostatic attracting structure including a conductive membrane constituting a pair of electrodes which are arranged in coplanar fashion and adjacent each other, a dielectric/protective layer covering said conductive membrane so as to protect said conductive membrane; and
    power supply means for applying a high voltage of direct current of opposite polarities to respective ones of said pair of electrodes.

2. An overhead projector as defined in claim 1, wherein said Fresnel plate is a Fresnel mirror of which a mirror surface is at said Fresnel surface, and said light source is contained within said projector head and illuminates said original material from above said original material.

3. An overhead projector as defined in claim 1, wherein said conducive membrane is of ceramic.

4. An overhead projector as defined in claim 1, wherein said electrodes are shaped as a pair of patterns arranged in alternation with each other.

5. An overhead projector as defined in claim 4, wherein said patterns are comb shaped.

6. An overhead projector as defined in claim 4, wherein said patterns are spirals.

7. An overhead projector as defined in claim 4, wherein said patterns interfinger.

8. An overhead projector as defined in claim 1, wherein said Fresnel plate is transparent, and said Fresnel surface is a bottom surface of said Fresnel plate.

9. An overhead projector as defined in claim 1, wherein a transparent prime coat layer is arranged between said Fresnel plate and said electrostatic attracting structure for attachment of said electrostatic attracting structure.

10. An overhead projector as defined in claim 1, wherein said stage further includes a reinforcing layer.

11. An overhead projector as defined in claim 10, wherein said reinforcing layer is below said Fresnel plate.

12. An overhead projector as defined in claim 10, wherein said reinforcing layer is a transparent material above said Fresnel plate for supporting said electrostatic attracting structure.

13. An overhead projector as defined in claim 12, wherein said transparent material is glass.

14. An overhead projector as defined in claim 1, wherein said stage further includes a base material supporting said conductive membrane, said base material being attached to said Fresnel plate.

15. An overhead projector as defined in claim 14, wherein said conductive membrane is formed on a top of said base material.

16. An overhead projector as defined in claim 1, wherein said dielectric/protective layer includes air.

17. An overhead projector as defined in claim 1, wherein said dielectric/protective layer is resin or glass.

18. An overhead projector as defined in claim 1, wherein said Fresnel surface is the upper surface of said Fresnel plate.

19. An overhead projector as defined in claim 1, wherein said stage further comprises a base material supporting said conductive membrane.

20. An overhead projector as defined in claim 19, wherein said base material is arranged on a top of said conductive membrane.

21. An overhead projector as defined in claim 19, wherein said base material is of glass.

22. An overhead projector as defined in claim 21, wherein the thickness of said base material is at most 0.8 mm.

23. An overhead projector as defined in claim 1, wherein said dielectric/protective layer includes:
    a dielectric material arranged between said pair of electrodes for insulating said electrodes; and a protective material arranged to cover said conductive material and said dielectric material.

24. An overhead projector as defined in claim 1, wherein said Fresnel plate is transparent, and said Fresnel surface is the lower surface of said Fresnel plate.

25. An overhead projector as defined in claim 2, wherein said stage further includes:
a base material arranged on a top of said conductive membrane for supporting said conductive membrane, said base material constituting said protective material; and
an intermediate layer arranged between said Fresnel mirror and said conductive membrane and attached to said Fresnel mirror and to said base material.

26. An overhead projector as defined in claim 25, wherein:
said dielectric material includes adhesive attaching said base material to said intermediate layer; and
said protective material further includes a hard coating covering the top of said base material.

27. An overhead projector as defined in claim 1, wherein said Fresnel surface is the upper surface of said Fresnel plate.

28. An overhead projector as defined in claim 27, wherein said stage further comprises a base material supporting said conductive membrane.

29. An overhead projector as defined in claim 27, wherein said conductive membrane is formed on the lower surface of said base material which constitutes protective material.

30. An overhead projector as defined in claim 29, wherein said base material is glass.

31. An overhead projector as defined in claim 30, wherein the thickness of said base material is at most 0.8 mm.

32. An overhead projector as defined in claim 1, wherein said Fresnel plate is of glass or resin.

33. An overhead projector as defined in claim 1, wherein said conductive membrane is formed by applying a coating of transparent conductive liquid, and by thermosetting said coating.

34. An overhead projector as defined in claim 1, wherein said conductive membrane is formed by microwave plasma sputtering.

35. An overhead projector as defined in claim 1, wherein said Fresnel plate is formed from polymethyl methacrylate or amorphous polyolefin.

36. An overhead projector as defined in claim 1, wherein said power supply means includes:
a first rectifier for converting first alternating current of a commercial power source into first direct current;
a self-starting blocking oscillator for converting said first direct current into second alternating current of a high voltage;
a second rectifier for converting said second alternating current into a second direct current of high voltage;
means to apply said voltage of said second direct current to said two electrodes; and
a resistor connected in series with either one of said electrodes for limiting current generated when said electrodes are short-circuited, said resistor having a resistance sufficient to prevent a user from getting an electrical shock.

37. An overhead projector as defined in claim 36, wherein:
said self-starting blocking oscillator includes a first transistor and a transformer; and
said transformer includes a primary winding connected in series with a collector of said first transistor and supplied with said first direct current, a secondary winding for generating said second alternating current by mutual induction with said primary winding, and a tertiary winding for supplying a base of said first transistor with current generated by mutual induction with said secondary winding.

38. An overhead projector as defined in claim 37, wherein a second resistor is connected in parallel with said secondary winding, and has a resistance sufficient for stabilizing operation of said self-starting blocking oscillator.

39. An overhead projector as defined in claim 37, further comprising a second transistor, connected between said base and an emitter of said first transistor, for turning off said first transistor by being turned on upon generation of current of at least a predetermined value in said first transistor.

40. An overhead projector as defined in claim 36, wherein said first rectifier is connected after a circuit, constituted by a bridged connection of two capacitors and two windings, for absorbing electrical noise.

* * * * *